United States Patent Office 3,529,345
Patented Sept. 22, 1970

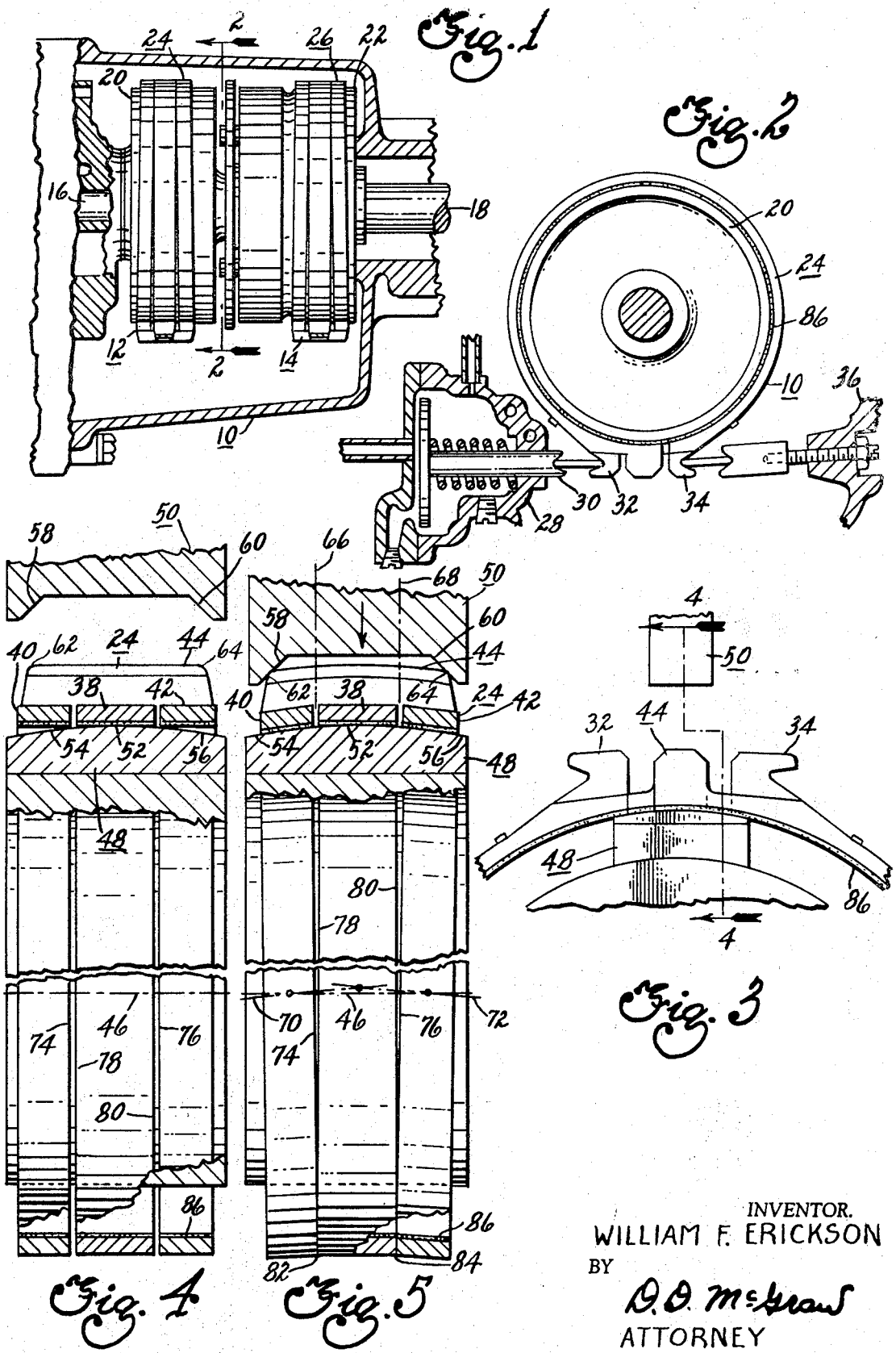

3,529,345
METHOD OF MANUFACTURING A BRAKE BAND
William F. Erickson, Centerville, Ohio, assignor to General Motors Corporation, Detroit, Mich., a corporation of Delaware
Original application July 11, 1966, Ser. No. 564,324, now Patent No. 3,403,757, dated Oct. 1, 1968. Divided and this application Mar. 7, 1968, Ser. No. 711,366
Int. Cl. B23p 9/00
U.S. Cl. 29—445      4 Claims

ABSTRACT OF THE DISCLOSURE

The method of manufacturing a brake band of the multiple wrap type in which a tie bar is welded or otherwise connected to a substantially cylindrical metal strap having friction material on the inner surface, the strap is slit or otherwise formed into an inner ribbon and outer ribbons, and the tie bar is formed to axially tilt the outer ribbons in opposite directitons relative to the inner ribbon so that the inner ribbon edge surfaces and the adjacent outer ribbon edge surfaces are in frictional engagement.

---

This application is a division of application Ser. No. 564,324, entitled "Brake Band and Method of Manufacturing the Same," filed July 11, 1966, now Pat. No. 3,403,757.

The invention relates to improvements over the method of manufacturing the brake band disclosed and claimed in U.S. Pat. 2,867,898—Vosler et al. The invention more particularly relates to improvements in the method of manufacturing a brake band to provide antirattle characteristics. The invention is particularly adapted to multiple wrap brake bands of the type commonly used in controlling gear ratios and power transmission conditions in planetary gear type transmissions.

Multiple wrap external brake bands have been utilized in conjunction with brake drums to establish various transmission operating conditions in automatic transmissions. In some installations when the temperature is sufficiently low brake band rattles have occurred when such brake bands were in the released position. For example, on cold starts when the temperature has been 40° F. or lower and when a typical transmission utilized in autombotive vehicle production is in the "park" or "neutral" position, the forward clutch drum has been found to pick up cold lubricating oil and drag the oil between the face of the drum and the friction surface on the inner diameter of the brake band. Under these conditions the oil may be sufficiently thick to drag the band around toward the apply position, tending to wind up the band like a spring. When the resisting force exceeds the drag force exerted through the relatively thick oil, the band will snap back to its full released position. This may occur in a relatively rapid repeating apply and release sequence and cause an objectionable rattle. Such a rattle is eliminated when the brake band is applied by placing the transmission in one of the drive conditions wherein the brake band is required to hold its associated clutch drum against rotation.

It has been found that by changing the natural frequency of the band wraps or ribbons by forcing the outer ribbons against the inner ribbon of a three-wrap band, for example, the rattle will be substantially eliminated. The frictional rubbing of the edge surfaces of the wraps against each other will also introduce a damping action in such a band since adjacent bands are arranged to wrap more tightly about the drum by circumferential tightening in opposite directions. Thus a band tending to be wrapped toward the apply position by oil shear will be in engagement with one which has no tendency to wrap toward the apply position. The contact of adjacent ribbons or wraps need be provided only at points circumferentially spaced from the tie bar connecting the various wraps together, so that when the brake band is applied the band is sufficiently flexible to permit normal surface engagement of the band friction surface and the drum, thereby keeping the bands axially separated during the apply position with the center of each band in a plane normal to the axis of rotation of the drum being braked. When the brake band is released the wraps again assume their adjacent edge point contacting positions. In practicing the method of manufacture, the tie bar is formed so that the requisite ribbon edge surface engagement is obtained. This is preferably done by bending the tie bar intermediate the ribbons to axially tilt the outer ribbons into edge surface engagement with the inner ribbon.

In the drawing:

FIG. 1 is a cross sectional view of a part of a motor vehicle transmission illustrating the use of frictiton or brake bands of this invention;

FIG. 2 is a cross sectional view taken in the direction of arrows 2—2 of FIG. 1 and illustrating certain controls and adjustments for the brake band;

FIG. 3 is a partial cross sectional view of a portion of one of the bands of FIG. 1 and showing the band positioned in a fixture preparatory to completing the manufacture of the brake band;

FIG. 4 is a partial section view of the band and fixture arrangement of FIG. 3 in the direction of arrow 4—4 of that figure;

FIG. 5 is a view similar to FIG. 4 and showing the band in the fixture with the last manufacturing step having been completed.

The transmission 10 schematically illustrated in FIG. 1 may be of the automatic type in which planeary gear assemblies 12 and 14 are provided to obtain different transmission operational conditions. The transmission has a driven shaft 16 and an output shaft 18 interconnected through the planetary gear assemblies 12 and 14. Each gear assembly includes drums 20, 22 and associated brake bands 24, 26. When a brake band is released the associated drum is permitted to rotate and when a brake band is applied the associated drum is prevented from rotation. Depending upon the particular transmission design, the drums may be connected to the various elements of the planetary gear assembly of which it forms a part. Thus by selectively engaging the brake bands various forward and reverse drives may be obtained. Since the particular transmission design forms no part of the invention other than the fact that the vehicle in which the transmission is installed may be started in a condition wherein the drum 20, for example, may be rotatable and brake band 24 may be in the released position, only a schematic representation of the transmission is shown in the drawing. As can be seen in FIG. 2, the transmission 10 may include a suitable hydraulic servomotor 28 which upon receipt of fluid under pressure will move the plunger 30 against the connecting lug 32 forming a part of the brake band 24. Other connecting lugs 34 also forming a part of the brake band 24 are held stationary by an adjusting device 36 for regulating the clearance between the drum 20 and the brake band 24.

Since brake bands 24 and 26 may be of similar construction, only brake band 24 is described in detail. The brake band includes an inner wrap or ribbon 38 and outer wraps or ribbons 40 and 42 which when the band is installed extend circumferentially about the drum 20. One end of the inner ribbon 38 is fixedly connected to one side of a tie bar 44 and the other end is positioned adjacent the other side of the tie bar in spaced relation thereto and is provided with the connecting lugs 34. The outer ribbons 40 and 42 each have one end connected to the side of the tie bar 44 opposite the side to which the end of inner ribbon 38 is connected. Ribbons 40 and 42 extend circumferentially so that their other ends are adjacent but spaced from tie bar 44 and having connecting lugs 34 secured thereon. The ribbons are spaced apart in the area adjacent the tie bar as indicated in FIGS. 4 and 5. The brake band as shown in FIGS. 3 and 4 may be of the same type as that disclosed in the above-noted Pat. 2,867,898, and manufactured in accordance with the method invention claimed therein up to a point. At this point the spaces between the ribbons are such that the bands are parallel so that each band lies in a plane substantially perpendicular to the axis of rotation. Each band axis is coincident with the other band axis as is illustrated by axis line 46 in FIG. 4. The band at this point may be referred to as a parallel ribbon multiple wrap band.

The parallel ribbon multiple wrap band is placed in a fixture schematically illustrated in FIGS. 3, 4 and 5. The fixture includes an anvil 48 and a force exerting press member 50. The anvil 48 is positioned radially inward of the band ribbons and has a center section 52 supporting the inner ribbon 38 radially inward of the tie bar 44. The portions 54 and 56 of the anvil 48 radially inward of ribbons 40 and 42 are preferably tapered in a radially decreasing taper away from the portion 52, as can best be seen in FIG. 4. The press member 50 is schematically illustrated as having inwardly beveled edges 58 and 60 forming side walls of a depression and fitting over the tie bar 44 so that the beveled edges 58 and 60 engage the outer corners 62 and 64 of the tie bar. Thus movement of the press member 50 toward the anvil 48 exerts forces acting to deform the tie bar ends radially inwardly of the band until the ribbons 40 and 42 contact the anvil portions 54 and 56 as seen in FIG. 5. This results in the tie bar being bent along crimp lines 66 and 68, which are generally in radial alignment with the spaces between the inner ribbon and the outer ribbons. This also tilts the axis 70 of ribbon 40 and the axis 72 of the ribbon 42 in opposite directions so that they are no longer aligned with the axis 46 of the center ribbon 38. This has the effect of moving the edge surfaces 74 and 76 of ribbons 40 and 42 toward the adjacent edge surfaces 78 and 80 of ribbon 38, with these adjacent edge surfaces being in contact with each other at points 82 and 84. It is preferred that the contact points 82 and 84 be circumferentially spaced from the tie bar substantially equidistant from the ends of the respective ribbons. In the usual brake band construction the contact points 82 and 84 are thus diametrically opposite the tie bar 44. Actual contact of the ribbons is necessary in order to change the natural frequency of the assembly and also to obtain the benefits of frictional damping afforded by adjacent ribbons. It has been found that good results are obtained when the ribbons are so positioned together that a separation force on the order of 1 lb. to 20 lbs. would be required.

The brake bands 24 may be constructed by providing a tie bar which is formed prior to attachment to the two separate ribbons so that the ribbons will assume the position shown in FIG. 5 upon completion of the assembly. Also, instead of utilizing a press member having the tapered edges 58 and 60, separate force transmitting members may be utilized which transmit forces in a direction substantially perpendicular to the edges 58 and 60 as illustrated, thereby deforming the tie bar in the desired manner. The bands may also be made by hand to contact as above described. Other types of anvils may be utilized so long as they permit sufficient permanent deformation of the tie bar to provide the necessary ribbon frictional contact at points 82 and 84.

When brake bands manufactured according to the invention are actuated, they are sufficiently flexible to permit substantially full engagement of the entire friction braking surface of the friction materials 86, formed on the inner annular surfaces of the ribbons, with the associated drum. Also, the bands are sufficiently spring-like in character so that upon release the ribbons return to the position shown in FIGS. 1 and 5. Thus when, for example, the transmission 10 is filled with oil such that drum 20 may rotate and pick up oil and tend to cause some of the ribbons to rattle as above described, the ribbons will be frictionally damped and the resonant frequencies will be such that the rattle is substantially eliminated.

What is claimed is:

1. The method of manufacturing a brake band adapted for double encirclement of a drum in the same direction of rotation wherein said band includes a cylindrical inner ribbon disposed between coextensively extending cylindrical outer ribbons with one end of the inner ribbon unitized with one side of a tie bar and the other end of the inner ribbon is adjacent but disconnected from the other side of the tie bar and one end of each of the outer ribbons is unitized with the side of the tie bar from which the inner ribbon is disconnected and the opposite end of each of the outer ribbons is disconnected from the side of the tie bar with which the inner ribbon is connected and and the adjacent edges of the inner and outer ribbons are spaced apart at the circumferential parts thereof adjacent the tie bar and are frictionally engaged at circumferential parts thereof circumferentially spaced from the tie bar when the brake band is released to change the natural frequency of the band ribbons and resist band drag windup, said method comprising the steps of:

fixedly connecting a tie bar to a substantially cylindrical metal strap having friction material on the inner surface thereof and forming an inner ribbon and outer ribbons adjacent the inner ribbon from the metal strap and providing the inner ribbon with an end disconnected from the tie bar on one side of the bar and the outer ribbons with ends disconnected from the tie bar on the other side of the bar, and forming the tie bar to axially tilt the outer ribbons in opposite directions relative to the inner ribbon and causing part of each of the outer ribbon edge surfaces adjacent the inner ribbon to engage the adjacent inner ribbon edge surface in frictional relation.

2. A method of manufacturing a brake band in accordance with claim 1, said tie bar forming step being carried out by supporting the portion of the tie bar connected to the inner ribbon, and applying forces to the ends of the tie bar sufficient to cause the tie bar to bend radially inward of the brake band along crimp lines at the points whereat the portion of the tie bar connected to the inner ribbon joins the portions of the tie bar connected to the outer ribbons.

3. A method of manufacturing a brake band in accordance with claim 2, the tie bar deformation step further comprising radially inward support of the inner ribbon underneath the tie bar and tapered support of the outer ribbons underneath the tie bar from a radius substantially equal to the radius of support of the inner ribbon to a lesser radius support at the sides of the outer ribbons opposite the inner ribbon, said forces being applied until the tie bar is deformed to the extent that the outer ribbons engage the entire tapered support surfaces provided radially under the tie bar.

4. A method of manufacturing a brake band in accordance with claim 1, said tie bar forming step being accomplished prior to attachment of the tie bar to the ribbons, and permanently attaching the tie bar and the ribbon ends to axially tilt the outer ribbons as aforesaid.

References Cited

UNITED STATES PATENTS

| | | | |
|---|---|---|---|
| 1,951,306 | 3/1934 | Johannsen et al. | 29—445 |
| 2,637,415 | 5/1953 | Winther | 188—77 X |
| 2,841,864 | 7/1958 | Kelly | 29—418 |
| 2,857,162 | 10/1958 | Zuercher. | |
| 2,867,898 | 1/1959 | Vosler et al. | 29—416 |
| 3,410,349 | 11/1968 | Troutman | 29—445 X |

FOREIGN PATENTS 1,159,276  12/1963  Germany.

CHARLIE T. MOON, Primary Examiner